United States Patent
Arnett

(10) Patent No.: US 8,256,445 B2
(45) Date of Patent: Sep. 4, 2012

(54) PRESSURIZING AND PRESSURE REGULATING VALVE AND FUEL SUPPLY SYSTEM EMPLOYING THE SAME

(75) Inventor: Eric Arnett, Grabger, IN (US)

(73) Assignee: Honeywell International Inc., Morristown, NJ (US)

( * ) Notice: Subject to any disclaimer, the term of this patent is extended or adjusted under 35 U.S.C. 154(b) by 1387 days.

(21) Appl. No.: 12/125,791

(22) Filed: May 22, 2008

(65) Prior Publication Data
US 2009/0320937 A1  Dec. 31, 2009

(51) Int. Cl.
*G05D 11/03* (2006.01)
(52) U.S. Cl. ............ 137/115.15; 137/118.06
(58) Field of Classification Search .......... 137/115.15, 137/118.06
See application file for complete search history.

(56) References Cited

U.S. PATENT DOCUMENTS

| | | | | |
|---|---|---|---|---|
| 2,115,637 A | * | 4/1938 | Leonard | 137/118.06 |
| 2,430,264 A | * | 11/1947 | Wiegand et al. | 137/118.06 |
| 2,843,140 A | * | 7/1958 | Lambeck et al. | 137/118.06 |
| 2,963,082 A | * | 12/1960 | Binford et al. | 137/118.06 |
| 3,360,199 A | * | 12/1967 | Sharpe | 137/118.06 |
| 3,692,038 A | * | 9/1972 | Hansen et al. | 137/115.15 |
| 3,777,773 A | * | 12/1973 | Tolbert | 137/115.15 |
| 4,541,451 A | * | 9/1985 | Wittren et al. | 137/118.06 |
| 4,664,137 A | * | 5/1987 | Leorat et al. | 137/118.06 |
| 4,966,196 A | | 10/1990 | Meyer | |
| 6,102,001 A | | 8/2000 | McLevige | |
| 6,584,762 B2 | | 7/2003 | Snow et al. | |

* cited by examiner

*Primary Examiner* — John Rivell
(74) *Attorney, Agent, or Firm* — Ingrassia Fisher & Lorenz, P.C.

(57) ABSTRACT

A pressurizing and pressure regulating valve is provided. In one embodiment, the pressurizing and pressure regulating valve includes a sleeve, a first flow passage formed through the sleeve, a second flow passage formed through the sleeve, and a piston slidably disposed in the sleeve. The piston is configured to move between: (i) a pressurizing position wherein the piston impedes fluid flow through the first flow passage, and (ii) a pressure limiting position wherein the piston impedes fluid flow through the second flow passage. A sensing chamber is fluidly coupled to the first flow passage and configured to receive pressurized fluid therefrom. The piston is configured to move from the pressurizing position to the pressure limiting position when the pressure within the sensing chamber exceeds a predetermined minimum pressure.

18 Claims, 2 Drawing Sheets

PRESSURIZING AND PRESSURE REGULATING VALVE AND FUEL SUPPLY SYSTEM EMPLOYING THE SAME

TECHNICAL FIELD

The present invention relates generally to aircraft propulsion systems and, more particularly, to a pressurizing and pressure regulating valve suitable for deployment within an aircraft fuel supply system.

BACKGROUND

Aircraft are commonly equipped with a fuel supply system that draws combustion fuel from a fuel source (e.g., a storage tank) and supplies it to a propulsion engine, such as a gas turbine engine. A representative fuel supply system includes a metering valve, a supply pump fluidly coupled between the metering valve and the fuel source, and a bypass valve fluidly coupled between the inlet and the outlet of the supply pump. The supply pump may be, for example, a fixed displacement pump that is mechanically coupled to a spool of the gas turbine engine. During operation, the supply pump provides combustion fuel to the metering valve, which meters the fuel in accordance with commands received from an engine controller. The metered combustion fuel is directed into the fuel manifold of the aircraft engine, mixed with air, and ignited to drive one or more engine turbines and to produce forward thrust. The bypass valve redirects excess fuel provided by the supply pump outlet back to the supply pump inlet.

In addition to the above-described components, an aircraft fuel supply system may further include a pressurizing valve fluidly coupled between the fuel metering valve and the aircraft engine. When the fuel pressure upstream of the pressurizing valve is undesirably low, the pressurizing valve impedes fuel flow to the aircraft engine to maintain fuel pressure upstream of the pressuring valve and downstream of the supply pump (e.g., at the supply pump outlet) above a predetermined minimum pressure, such as 250 pounds per square inch (psi). By maintaining the back pressure above a predetermined threshold in this manner, the pressurizing valve helps to ensure that pressure-sensitive components downstream of the supply pump (e.g., fuel-conducting servomechanism of the type described below) operate effectively and efficiently.

In addition to supplying combustion fuel to an aircraft engine manifold, an aircraft fuel supply system may also supply fuel to one or more fuel-conducting servomechanisms ("servos"). These servos perform various functions aboard the aircraft and may include, for example, a variable-geometry servo, a bleed air servo, and a metering valve actuator servo. The operation of such servos may be negatively impacted if the pressure of the fuel supplied thereto surpasses a maximum pressure. Thus, to prevent the pressure of the fuel supplied to the servos from surpassing a maximum pressure threshold, a pressure regulating valve may be disposed between the fuel supply system pump and the control servos. During operation, the pressure regulating valve selectively impedes fuel flow to maintain the pressure of the fuel supplied to the servos below a predetermined maximum pressure, which may be, for example, 300 psi.

It should thus be appreciated that aircraft fuel supply systems of the type described above commonly employ two separate pressure regulating devices; i.e., a pressurizing valve that maintains fuel pressure at supply pump outlet above a predetermined minimum pressure, and a pressure regulating valve that maintains a downstream fuel pressure (i.e., the pressure of the fuel supplied to one or more servos) below a predetermined maximum pressure. Each pressure regulating device generally includes a separate valve housing (e.g., a sleeve), valve element (e.g., a piston), spring, mounting hardware, and so on. As a result, the utilization of two independent pressure regulating devices negatively impacts the overall part count, cost, weight, and envelope of the fuel supply system.

Accordingly, it is desirable to provide a unitary and compact valve capable of performing both pressurizing and pressure regulating functions. It would also be desirable to provide a fuel supply system suitable for deployment on an aircraft that employs such a pressurizing and pressure regulating valve. Other desirable features and characteristics of the present invention will become apparent from the subsequent Detailed Description and the appended claims, taken in conjunction with the accompanying drawings and this Background.

BRIEF SUMMARY

A pressurizing and pressure regulating valve is provided. In one embodiment, the pressurizing and pressure regulating valve includes a sleeve, a first flow passage formed through the sleeve, a second flow passage formed through the sleeve, and a piston slidably disposed in the sleeve. The piston is configured to move between: (i) a pressurizing position wherein the piston impedes fluid flow through the first flow passage, and (ii) a pressure limiting position wherein the piston impedes fluid flow through the second flow passage. A sensing chamber is fluidly coupled to the first flow passage and configured to receive pressurized fluid therefrom. The piston is configured to move from the pressurizing position to the pressure limiting position when the pressure within the sensing chamber exceeds a predetermined minimum pressure.

A fuel supply system is also provided for use in conjunction with a fuel source, an engine, and a servomechanism. In one embodiment, the fuel supply system includes a supply pump having a supply pump inlet fluidly coupled to the fuel source and including a supply pump outlet, a metering valve fluidly coupled to the supply pump outlet, and a pressurizing and pressure regulating valve. The pressurizing and pressure regulating valve includes a sleeve, a first flow passage formed through the sleeve and fluidly coupled between the supply pump outlet and the servomechanism, a second flow passage formed through the sleeve and fluidly coupled between the supply pump outlet and the engine, and a piston slidably disposed in the sleeve. The piston is configured to move between: (i) a pressurizing position wherein the piston impedes fluid flow through the first flow passage to maintain the pressure at the supply pump outlet above a predetermined minimum pressure, and (ii) a pressure limiting position wherein the piston impedes fluid flow through the second flow passage to maintain the pressure of the fuel supplied to the servomechanism below a predetermined maximum pressure.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
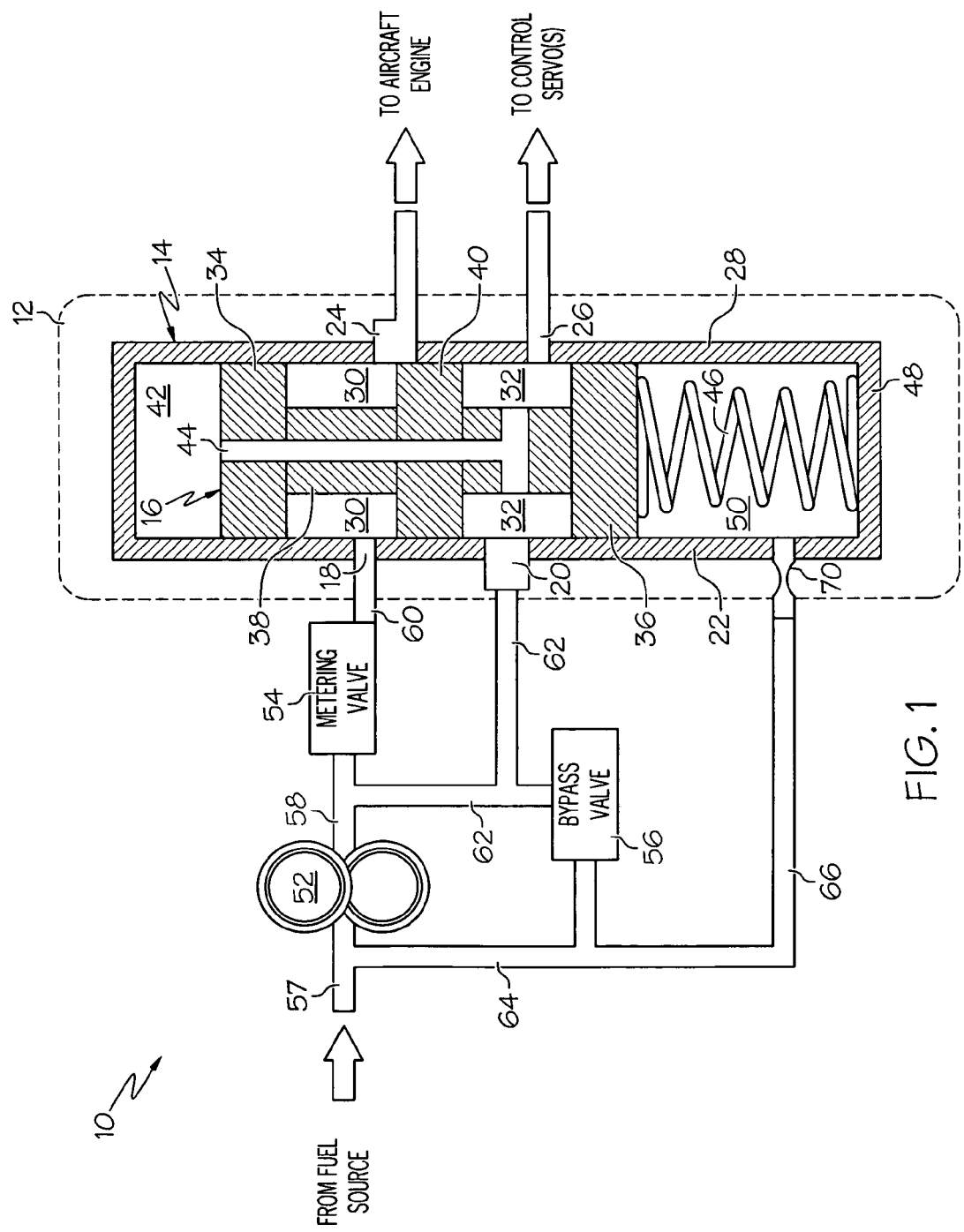
FIGS. 1 and 2 are schematic views of a fuel supply system including a pressurizing and pressure regulating valve in a pressurizing position and a pressure limiting position, respectively, in accordance with an exemplary embodiment.
Figure 2:
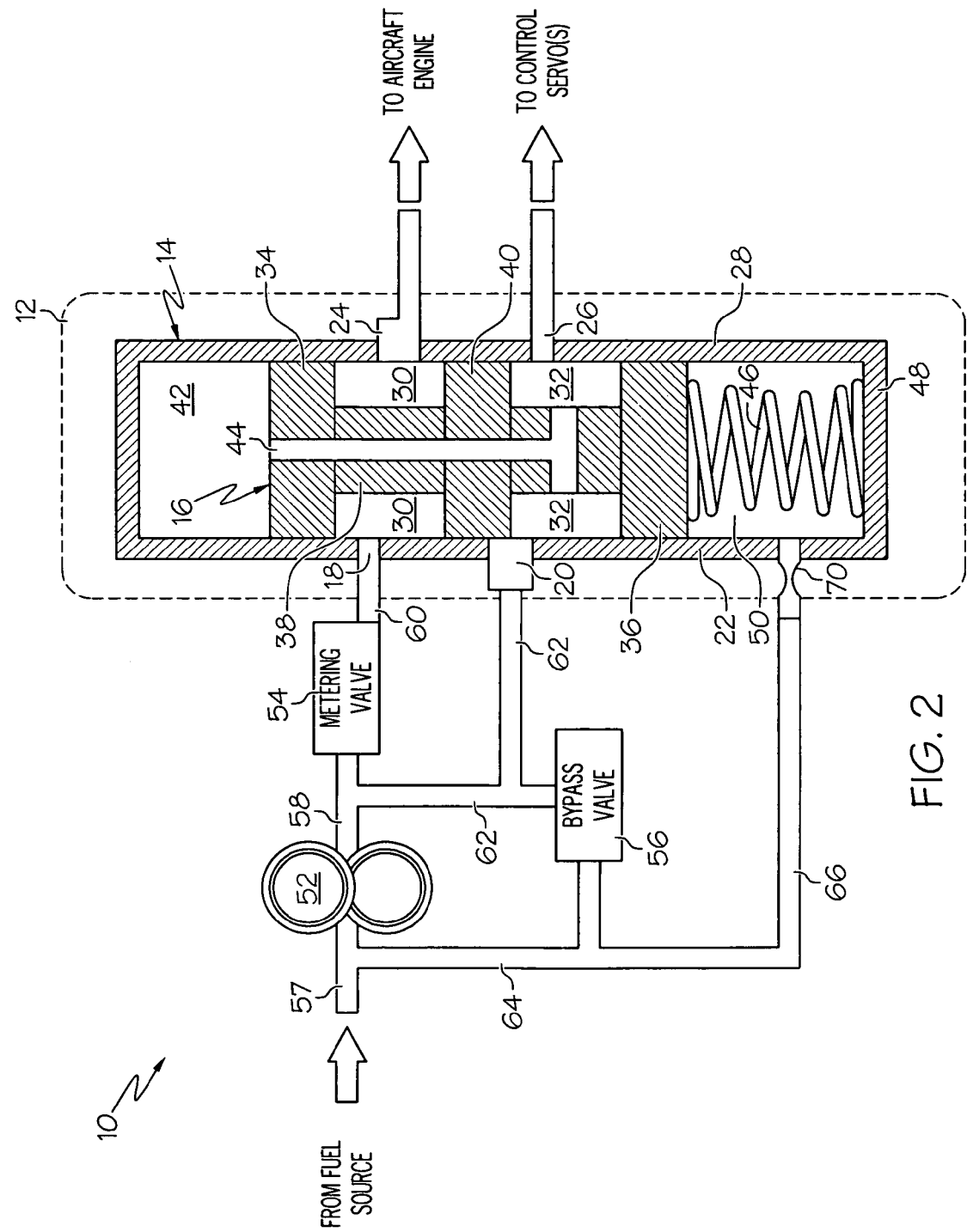

FIGS. 1 and 2 are schematics of a fuel supply system 10 suitable for providing fuel to an aircraft engine and to one or more control servomechanisms ("servos") in accordance with an exemplary embodiment. FIGS. 1 and 2 also specifically illustrate, in cross-section, a pressurizing and pressure regulating valve 12 in pressurizing and pressure limiting positions, respectively. Pressurizing and pressure regulating valve 12 is conveniently deployed within fuel supply system 10 and is well-suited for performing the functions required thereby. This notwithstanding, pressurizing and pressure regulating valve 12 is by no means limited to deployment within a fuel supply system; regulating valve 10 may readily disposed within various other types of hydraulic and pneumatic systems.

As shown in FIGS. 1 and 2, pressurizing and pressure regulating valve 12 comprises a sleeve 14 and a piston 16 slidably mounted within sleeve 14. A first inlet port 18 and a second inlet port 20 are formed through a first sidewall 22 of sleeve 14, and a first outlet port 24 and a second outlet port 26 are formed through a second sidewall 28 of sleeve 14. Inlet port 18 is fluidly coupled to outlet port 24 by a first flow chamber 30 within sleeve 14 and generally defined by sleeve 14 and piston 16. Similarly, inlet port 20 and outlet port 26 are fluidly coupled by a second flow chamber 32 within sleeve 14 and generally defined by sleeve 14 and piston 16. Inlet port 18, outlet port 24, and flow chamber 30 collectively form a first flow passage 18, 24, 30 through sleeve 14; and inlet port 20, outlet port 26, and flow chamber 32 collectively form a second flow passage 20, 26, 32 through sleeve 14. Although sidewalls 22 and 28 are referred to as "first" and "second" sidewalls herein, sidewalls 22 and 28 may be integrally formed as a unitary tubular wall. Furthermore, although illustrated in FIG. 1 as including only a single outlet port 24 and a single outlet port 26, sleeve 14 may include multiple ones of outlet port 24 and/or of outlet port 26. For example, sleeve 14 may comprise a tubular sidewall having multiple outlet ports circumferentially spaced about the longitudinal axis of sleeve 14.

In the illustrated exemplary embodiment, piston 16 comprises: (i) a first end portion 34, (ii) a second end portion 36 substantially opposite first end portion 34, and (iii) an intermediate portion 38 extending between first end portion 34 and second end portion 36. First end portion 34 and second end portion 36 each extend radially outward to sealingly engage the inner surface of sleeve 14. Intermediate portion 38 has a reduced outer diameter relative to first end portion 34 and second end portion 36 and does not sealingly engage the inner surface of sleeve 14. However, piston 16 further comprises an annular flange 40 that is fixedly coupled to (e.g., integrally formed with) intermediate portion 38. As do end portions 34 and 36, flange 40 extends radially outward to sealingly engage the interior of sleeve 14. In so doing, flange 40 partitions flow chambers 30 and 32. Furthermore, as piston 16 translates within sleeve 14, flange 40 selectively obstructs fuel flow through flow passage 18, 24, 30 and through flow passage 20, 26, 32 as described in more detail below.

End portion 34 of piston 16 and sleeve 14 cooperate to further define a third chamber within sleeve 14, namely, a sensing chamber 42. A sensing channel 44 fluidly couples sensing chamber 42 to flow passage 20, 26, 32. In particular, sensing channel 44 fluidly couples sensing chamber 42 to flow chamber 32 of flow passage 20, 26, 32. In the exemplary embodiment shown in FIGS. 1 and 2, sensing channel 44 is formed through first end portion 34 and intermediate portion 38 of piston 16. However, in alternative embodiments, sensing channel 44 may be formed through a sidewall (e.g., sidewall 22 or sidewall 28) of sleeve 14. In still further embodiments, sensing channel 44 may assume the form of an exterior conduit fluidly coupled between outlet port 26 and sensing chamber 42. In this latter case, an aperture may be provided through sleeve 14 to permit fluid communication between the external sensing channel and sensing chamber 42. Due to the fluid coupling provided by sensing channel 44, the pressure within sensing chamber 42 will generally correspond with, and typically be substantially equivalent to, the pressure within flow chamber 32 of flow passage 20, 26, 32.

As may be appreciated by comparing FIG. 1 to FIG. 2, piston 16 may translate within sleeve 14 amongst: (i) a pressurizing position (FIG. 1) wherein flange 40 partially obstructs fuel flow through flow passage 18, 24, 30; (ii) a pressure limiting position (FIG. 2) wherein flange 40 partially obstructs fuel flow through flow passage 20, 26, 32; and (iii) various intermediate positions. A compression spring 46 is disposed within sleeve 14 and biases piston 16 toward the pressurizing position; e.g., in the example shown in FIG. 1, toward sensing chamber 42. For example, spring 46 may be compressed between end portion 36 of piston 16 and an end wall 48 of sleeve 14. As indicated in FIGS. 1 and 2, spring 46 may be disposed within a fourth chamber 50 provided within sleeve 14 and generally defined by end portion 36 of piston 16 and the interior of sleeve 14. In a preferred group of embodiments, chamber 50 is fluidly coupled to a reference pressure, such as ambient or the inlet of a supply pump (described below). For this reason, chamber 50 may be referred to herein as "reference pressure chamber 50." To provide additional translational stability to piston 16, one or more dampening orifices may be incorporated into pressurizing and pressure regulating valve 12. For example, and as shown in FIGS. 1 and 2, a damping orifice 70 may be formed in sleeve 14 between conduit 66 and reference pressure chamber 50. Alternatively, a similar damping orifice may be formed in piston 16 between sensing chamber 42 and the inlet of sensing channel 44. The translational position of piston 16 is generally determined by force exerted on piston 16 by the fuel within sensing chamber 42, by the fuel within reference pressure chamber 50, and by spring 46 as described in more detail below.

During operation, pressurizing and pressure regulating valve 12 performs two main functions. First, pressurizing and pressure regulating valve 12 maintains the pressure upstream of inlet port 18 above a predetermined minimum pressure. Thus, valve 12 may conveniently be disposed downstream of a supply pump and pressure-sensitive components (e.g., a fuel metering valve) that operate most efficiently above a predetermined minimum pressure. Secondly, pressurizing and pressure regulating valve 12 prevents the pressure downstream of outlet port 26 from surpassing a predetermined maximum pressure. Thus, valve 12 is further conveniently positioned upstream of pressure-sensitive components (e.g., servomechanisms) that operate most efficiently below a predetermined maximum pressure. These characteristics render pressurizing and pressure regulating valve 12 ideal for use in conjunction with a fuel supply system of the type commonly deployed on an aircraft. For this reason, the operation of valve 12 will be described below in the context of fuel supply system 10.

In the exemplary embodiment shown in FIGS. 1 and 2, fuel supply system 10 comprises a supply pump 52, a metering valve 54, and a bypass valve 56. A first conduit 57 fluidly couples the inlet of supply pump 52 to a fuel source, such as an aircraft's fuel tank; a second conduit 58 fluidly couples the outlet of supply pump 52 to the inlet of metering valve 54; and a third conduit 60 fluidly couples the outlet of metering valve 54 to inlet port 18 of flow passage 18, 24, 30. The outlet of supply pump 52 is further fluidly coupled to inlet port 20 of flow passage 20, 26, 32 and to the inlet of bypass valve 56 by way of a bifurcated conduit 62. The outlet of bypass valve 56 is, in turn, fluidly coupled to the inlet of pump 52 by way of a conduit 64. Finally, reference pressure chamber 50 is fluidly coupled to the inlet of supply pump 52 by way of a conduit 66, which intersects conduit 64 as shown in FIGS. 1 and 2. By fluidly coupling reference pressure chamber 50 to the inlet of pump 52 (or another known reference pressure) in this manner, the translational movement of piston 16 may be more accurately controlled.

In the exemplary embodiment illustrated in FIGS. 1 and 2, supply pump 52 assumes the form of a gear-driven fixed displacement pump, which may be mechanically coupled to the spool of an aircraft's gas turbine engine. However, in alternative embodiments, supply pump 52 may comprise various other types of pumps or devices suitable for supplying a pressurized fluid, such as combustion fuel. Notably, in embodiments wherein supply pump 52 assumes the form of a variable displacement pump, fuel supply system 10 may not include a bypass valve.

As stated above, inlet ports 18 and 20 are fluidly coupled to the outlets of metering valve 54 and pump 52, respectively. In the exemplary context of system 10, outlet port 24 is fluidly coupled, and supplies combustion fuel, to the fuel manifold of an aircraft engine. Outlet port 26 is fluidly coupled, and supplies fuel, to one or more fuel-conducting servomechanisms. Outlet port 26 may be fluidly coupled to any suitable type of servo or servos. By way of example, outlet port 26 may be fluidly coupled to a servomechanism that controls an actuator (not shown) associated within metering valve 54 in accordance with commands issued from an engine controller. Additionally or alternatively, outlet port 26 may be fluidly coupled to a variable geometry servomechanism, a bleed valve servomechanism, and the like.

The fuel output of supply pump 52 typically varies during operation of system 10. For example, if supply pump 52 is driven by a gear train coupled to the spool of the aircraft's gas turbine engine, the fuel output of pump 52 will vary in relation to engine speed. Also, during operation of system 10, fuel flow across metering valve 54 fluctuates in relation to the position of metering valve 54, which is continually adjusted to accommodate the combustion requirements of the aircraft engine. This notwithstanding, the fuel output of pump 52 will generally well-exceed the fuel requirements of metering valve 54. This excess fuel flows through conduit 62 and into bypass valve 56, which redirects a portion of the excess fuel through conduit 64 and, therefore, back to the inlet of pump 52. The remaining portion of the excess fuel supplied by pump 52 is directed into inlet port 20; flows through flow passage 20, 26, 32; and is ultimately provided to the control servo or control servos downstream of outlet port 26.

The operation of pressurizing and pressure regulating valve 12 will now be described in conjunction with fuel supply system 10. Referring initially to FIG. 1, when piston 16 is in the illustrated pressurizing position (FIG. 1), flange 40 does not obstruct fuel flow through inlet port 20. Consequently, the pressure within flow passage 20, 26, 32, and therefore the pressure within sensing chamber 42, is substantially equivalent to the pressure appearing at the outlet of pump 52. When the fuel output of pump 52 is relatively limited, the pressure within sensing chamber 42 is relatively low. The force exerted on piston 16 by the fuel within sensing chamber 42 is consequently exceeded by the force exerted on piston 16 by spring 16 and the fuel within reference pressure chamber 50. As a result, piston 16 is maintained in the illustrated pressurizing position (FIG. 1) by the bias force of spring 46.

Referring still to FIG. 1, when piston 16 is in the illustrated pressurizing position (FIG. 1), flange 40 of piston 16 blocks a portion of outlet port 24 thus impeding fuel flow through flow passage 18, 24, 30. By impeding fuel flow through flow passage 18, 24, 30 in this manner, piston 16 increases the pressure upstream of inlet port 18 and, therefore, at the outlet of fuel pump 52. Thus, in the illustrated pressurizing position, pressurizing and pressure regulating valve 12 maintains the pump outlet pressure above a predetermined minimum pressure. When piston 16 is in the pressurizing position shown in FIG. 1, flange 40 provides little to no impedance to fuel flow through flow passage 20, 26, 32. Consequently, the fuel pressure at the outlet of pump 52 is substantially equivalent to fuel pressure of the fuel supplied to the control servo or servos disposed downstream of valve 12. Thus, by maintaining the fuel pressure at the outlet of supply pump 52 above a predetermined minimum pressure, pressurizing and pressure regulating valve 12 helps to ensure the efficient operation of the servomechanisms downstream of valve 12. As should be readily appreciated, the predetermined minimum pressure will be determined by a variety of factors, including the characteristics of spring 46. When pressurizing and pressure regulating valve 12 is utilized in conjunction with a fuel metering valve, such as metering valve 54, the predetermined minimum pressure is may be, for example, approximately 250 psi.

When the fuel output of pump 52 increases, so too does the pressure within flow passage 20, 26, 32 and, therefore, within sensing chamber 42. When the force exerted on piston 16 by the fuel within sensing chamber 42 exceeds the force exerted on piston 16 by spring 46 and the fuel within reference pressure chamber 50, piston 16 moves toward the pressure limiting position shown in FIG. 2. In the pressure limiting position (FIG. 2), flange 40 no longer blocks any portion of outlet port 24. As a result, pressurizing and pressure regulating valve 12 no longer serves to maintain the pressure upstream of outlet port 18 and at the outlet of supply pump 52 above the predetermined minimum pressure; however, valve 12 no longer needs to perform such a pressurizing function as the fuel pressure appearing at the outlet of supply pump 52 has significantly increased.

When piston 16 moves into the pressure limiting position illustrated in FIG. 2, flange 40 impedes fuel flow through flow passage 20, 26, 32. In particular, flange 40 blocks a portion of inlet port 20. In so doing, flange 40 impedes fuel flow through flow passage 20, 26, 32 to maintain the pressure of the fuel supplied to the control servos below a predetermined maximum pressure. In this manner, pressurizing and pressure regulating valve 12 may ensure that pressure of the fuel supplied to the control servos does not reach an undesirably high level at which control servo performance may be negatively impacted. The predetermined maximum pressure will be determined by a variety of factors, including the characteristics of spring 46. In one example, valve 12 may be configured such that the predetermined maximum pressure is approximately 300 psi.

The foregoing has described one exemplary pressurizing position (FIG. 1) and one exemplary pressure limiting position (FIG. 2) for clarity; however, it should be appreciated that, during actual operation, piston 16 will between a range of pressurizing positions and a range of pressure limiting positions. In the range of pressurizing positions, the translational position of piston 16, and thus the flow area of outlet port 24 covered by flange 40, will generally be determined by the pressure within sensing chamber 42. As noted above, in the pressurizing positions, flange 40 provides little to no impedance to fuel flow through flow passage 20, 26, 32. Therefore, in the pressurizing positions, the pressure within sensing chamber 42 is substantially equivalent to the pressure appearing at the outlet of pump 52. Piston 16 will consequently translate amongst the various pressurizing positions in relation to the fuel pressure appearing at the outlet of supply pump 52 and, therefore, the pressure of the fuel supplied to the downstream control servos. For example, as the fuel pressuring appearing at the outlet of pump 52 increases from an extremely low pressure to a moderately low pressure, piston 16 will move from a first pressurizing position wherein flange 40 covers a greater area of outlet port 24 to a second pressurizing position wherein flange 40 covers a lesser area of outlet port 24. Piston 16 will thus adjust its position as needed to maintain the fuel pressure appearing at the outlet of pump 52 above the predetermined minimum pressure.

When in a pressure limiting position, such as that shown in FIG. 2, the translation position of piston 16 will generally be determined by the pressure within sensing chamber 42. As noted above, in the pressure limiting positions, the pressure within sensing chamber 42 is substantially equivalent to the fuel pressure within flow chamber 32 and, therefore, the fuel pressure downstream of outlet port 26. Thus, in the pressure limiting positions, the translation position of piston 16 will vary in relation to the pressure of the fuel supplied to the control servos. For example, as the fuel pressuring downstream of outlet port 26 increases from a moderately high pressure to an extremely high pressure, piston 16 will move from a first pressure limiting position wherein flange 40 covers a lesser area of inlet port 20 to a second pressure limiting position wherein flange 40 covers a greater area of inlet port 20. In this manner, piston 16 will adjust its position as needed to maintain the pressure downstream of outlet port 26 below the predetermined maximum pressure.

It will be appreciated that the geometries (e.g., shape, flow area, etc.) of the inlet and outlet ports provided through sleeve 14 will inevitably vary amongst different embodiments. In general, the geometry of inlet port 20 will be determined, in large part, by fuel flow requirements of the servomechanisms downstream of valve 12. Similarly, the geometry of outlet port 24 will be determined, in large part, by the combustion flow requirements of the aircraft engine. In the majority of applications, the combustion flow will be substantially higher than the servo flow at their respective maximums; the flow port height in the piston translation direction and net width in the axial direction will generally be sized accordingly. Varying the shape of the ports provided through sleeve 14 from a conventional rectangular geometry may provide the benefit of added stability over a greater fuel flow range.

In view of the above, it should be appreciated that there has been provided at least one example of a pressurizing and pressure regulating valve that maintains the pressure upstream of a first flow passage above a predetermined minimum pressure and that maintains the pressure downstream of a second flow passage below a predetermined maximum pressure. There has also been provided an exemplary embodiment of a fuel supply system that includes such a pressurizing and pressure regulating valve and that is well-suited for deployment on an aircraft.

Alternative embodiments of the pressurizing and pressure regulating valve may also be employed with a separate servomechanism that is fluidly coupled between the servo outlet port (e.g., outlet port 26 in FIGS. 1 and 2) and the sensing chamber (e.g., sensing chamber 42 in FIGS. 1 and 2). In such embodiments, a sensing chamber provided within the servomechanism may be fluidly coupled to a flow passage provided through the pressurizing and pressure regulating valve. During operation, the sensing chamber provided within the servomechanism monitors a fluid pressure within or through the first flow passage (e.g., at the outlet port) and adjusts the fluid pressure within sensing chamber to control the translational position of the piston (e.g., piston 16 in FIGS. 1 and 2) as needed. Furthermore, in such embodiments, the pressurizing and pressure regulating valve may not include a sensing channel (e.g., channel 44) and/or a damping orifice (e.g., orifice 70 in FIGS. 1 and 2).

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A pressurizing and pressure regulating valve, comprising:
　　a sleeve;
　　a first flow passage formed through the sleeve;
　　a second flow passage formed through the sleeve;
　　a piston slidably disposed in the sleeve and configured to move between: (i) a pressurizing position wherein the piston impedes fluid flow through the first flow passage, and (ii) a pressure limiting position wherein the piston impedes fluid flow through the second flow passage;
　　a sensing chamber fluidly coupled to the first flow passage and configured to receive pressurized fluid therefrom, the piston configured to move from the pressurizing position to the pressure limiting position when the pressure within the sensing chamber exceeds a predetermined minimum pressure; and
　　a sensing channel formed through the piston and fluidly coupling the sensing chamber to the first flow chamber.

2. A pressurizing and pressure regulating valve according to claim 1 wherein the sensing chamber is substantially defined by the sleeve and the piston.

3. A pressurizing and pressure regulating valve according to claim 1 further comprising a spring disposed in the sleeve and biasing the piston toward the pressurizing position.

4. A pressurizing and pressure regulating valve according to claim 3 wherein the pressure within the sensing chamber acts on the piston in opposition to the spring.

5. A pressurizing and pressure regulating valve according to claim 1 wherein first flow passages comprises:
　　a first inlet port formed through the sleeve;
　　a first outlet port formed through the sleeve; and
　　a first flow chamber substantially defined by the sleeve and the piston, the first flow chamber fluidly coupled between the first inlet port and the first outlet port.

6. A pressurizing and pressure regulating valve according to claim 5 wherein piston comprises a flange sealingly engaging an inner surface of the sleeve.

7. A pressurizing and pressure regulating valve according to claim 5 wherein the flange substantially blocks the first outlet port in the pressurizing position and does not substantially block the first outlet port in the pressure limiting position.

8. A pressurizing and pressure regulating valve according to claim 6 wherein the second flow passage comprises:
   a second inlet port formed through the sleeve;
   a second outlet port formed through the sleeve; and
   a second flow chamber substantially defined by the sleeve and the piston, the second flow chamber fluidly coupled between the second inlet port and the second outlet port.

9. A pressurizing and pressure regulating valve according to claim 8 wherein the flange generally partitions the first flow chamber and the second flow chamber.

10. A pressurizing and pressure regulating valve according to claim 8 wherein the flange: (i) substantially blocks at least one of the second inlet port and the second outlet port in the pressurize limiting position, and (ii) does not substantially block the second inlet port and does not substantially block the second outlet port in the pressurizing position.

11. A pressurizing and pressure regulating valve according to claim 3 wherein the piston comprises:
   a first end portion sealingly engaging the sleeve;
   a second end portion sealingly engaging the sleeve; and
   an intermediate portion disposed between the first end portion and the second end portion.

12. A pressurizing and pressure regulating valve according to claim 11 wherein the sensing chamber is substantially defined by the first end portion and the sleeve.

13. A pressurizing and pressure regulating valve according to claim 11 wherein the spring is compressed between the second end portion and the sleeve.

14. A pressurizing and pressure regulating valve according to claim 3 wherein the pressurizing and pressure regulating valve is configured to be utilized in conjunction with a reference pressure source, and wherein the pressurizing and pressure regulating valve further comprises a reference pressure chamber substantially defined by the piston and the sleeve and fluidly coupled to the reference pressure source.

15. A pressurizing and pressure regulating valve according to claim 1 wherein the spring resides within the reference pressure chamber.

16. A pressurizing and pressure regulating valve, comprising:
   a sleeve having a first inlet port, a second inlet port, a first outlet port, and a second outlet port formed therethrough;
   a piston slidably disposed in the sleeve and cooperating therewith to form a sensing chamber, a first flow chamber fluidly coupled between the first inlet port and the first outlet port, a second flow chamber fluidly coupled between the second inlet port, and a reference pressure chamber, the piston configured to translate between: (i) a pressurizing position wherein the piston impedes fluid flow from the first inlet port to the first outlet port, and (ii) a pressure limiting position wherein the piston impedes fluid flow from the second inlet port to the second outlet port;
   a spring residing in the reference pressure chamber and biasing the piston toward the pressurizing position; and
   a sensing channel fluidly coupling the sensing chamber to the second flow chamber, the piston configured to move from the pressurizing position into the pressure limiting position when the pressure within the sensing chamber exceeds a predetermined minimum pressure.

17. A fuel supply system for use in conjunction with a fuel source, an engine, and a servomechanism, the fuel supply system comprising:
   a supply pump including a supply pump inlet fluidly coupled to the fuel source and including a supply pump outlet;
   a metering valve fluidly coupled to the supply pump outlet; and
   a pressurizing and pressure regulating valve, comprising:
      a sleeve;
      a first flow passage formed through the sleeve and fluidly coupled between the supply pump outlet and the servomechanism;
      a second flow passage formed through the sleeve and fluidly coupled between the supply pump outlet and the engine; and
      a piston slidably disposed in the sleeve and configured to move between:
   (i) a pressurizing position wherein the piston impedes fluid flow through the first flow passage to maintain the pressure at the supply pump outlet above a predetermined minimum pressure, and (ii) a pressure limiting position wherein the piston impedes fluid flow through the second flow passage to maintain the pressure of the fuel supplied to the servomechanism below a predetermined maximum pressure.

18. A fuel supply system according to claim 17 wherein the pressurizing and pressure regulating valve further comprises:
   a spring disposed in the sleeve and biasing the piston toward the pressurizing position; and
   a sensing chamber substantially defined by the sleeve and the piston, the sensing chamber fluidly coupled to the first flow passage and configured to receive pressurized fuel therefrom, the pressurized fluid acting on the piston in opposition to the spring such that the piston moves toward the pressure limiting position when the pressure within the sensing chamber exceeds a predetermined minimum pressure.

* * * * *